Sept. 18, 1928.
F. C. BIGGERT, JR
1,684,617
FLYING SHEARS
Filed Feb. 21, 1923
2 Sheets-Sheet 1
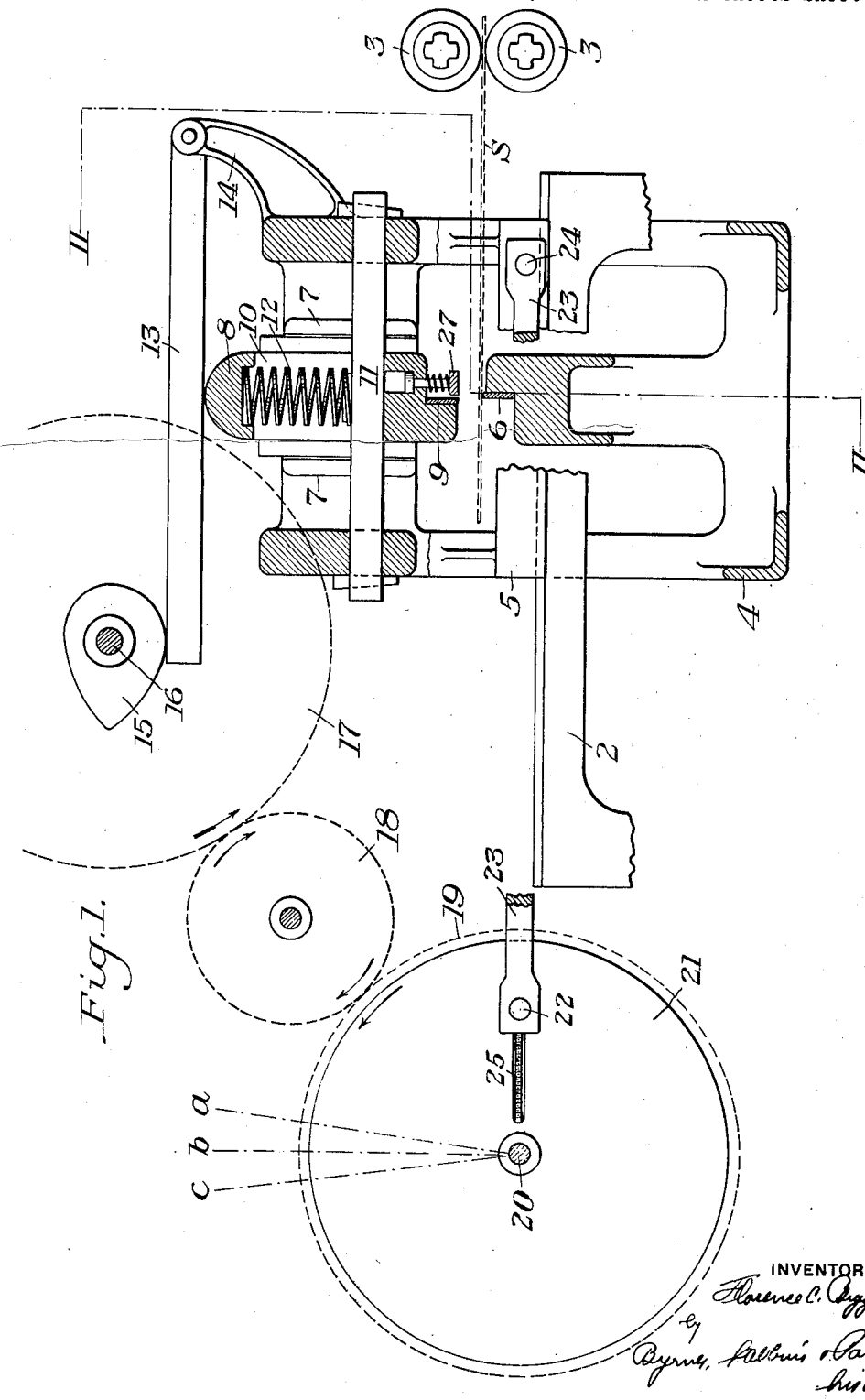

Sept. 18, 1928.
F. C. BIGGERT, JR
1,684,617
FLYING SHEARS
Filed Feb. 21, 1923 2 Sheets-Sheet 2
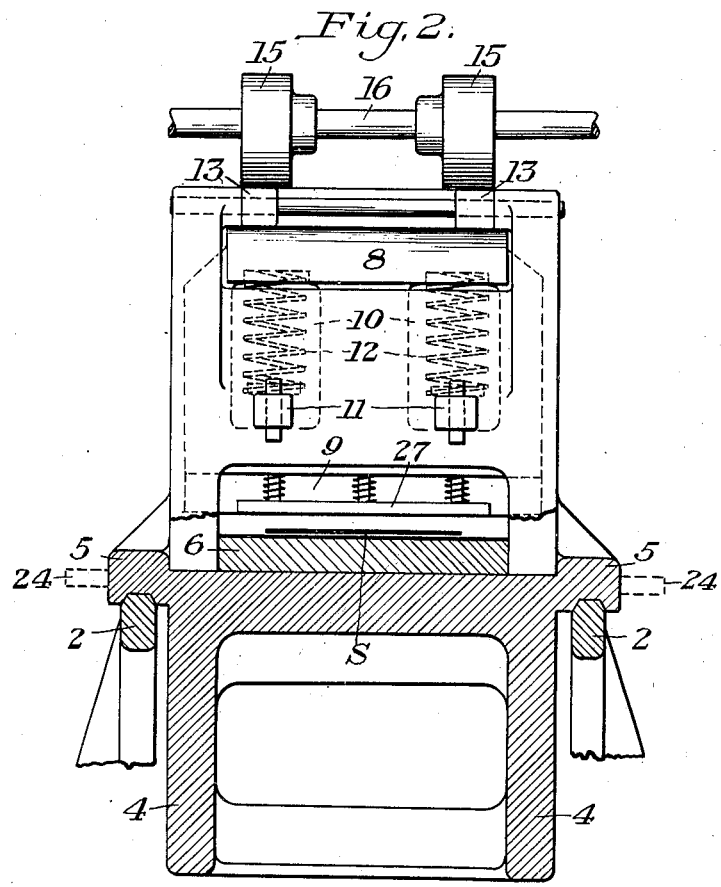
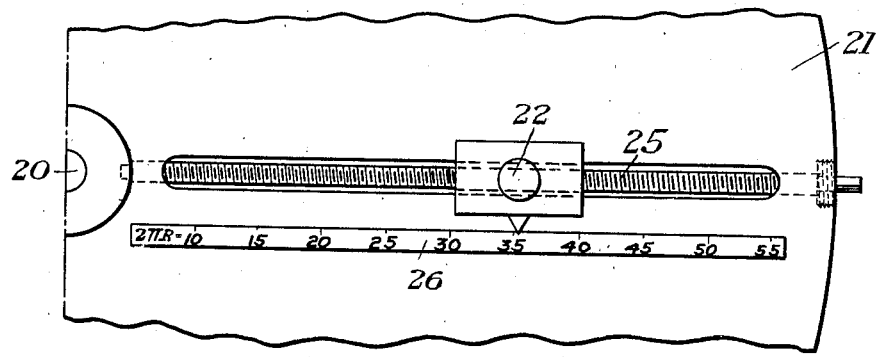

Patented Sept. 18, 1928.

1,684,617

UNITED STATES PATENT OFFICE.

FLORENCE C. BIGGERT, JR., OF CRAFTON, PENNSYLVANIA, ASSIGNOR TO UNITED ENGINEERING AND FOUNDRY COMPANY, OF PITTSBURGH, PENNSYLVANIA, A CORPORATION OF PENNSYLVANIA.

FLYING SHEARS.

Application filed February 21, 1923. Serial No. 620,394.

The present invention relates broadly to metal cutting, and more particularly to flying shears for the cutting of elongated pieces of material as delivered by the last stand of rolls of a rolling mill. These pieces will hereinafter be referred to throughout the specification and claims as "strips", it being understood that the word strips is used generically as defining billets, bars, rods, etc.

It has heretofore been customary in the art to which this invention appertains to utilize flying shears of the swinging type, although other forms of sheering mechanisms, such as rotary shears, have been used to some extent. Swinging shears, although efficiently performing the shearing of the strips into lengths, are objectionable in that they necessarily operate more or less intermittently, thereby requiring an undue expenditure of power for acceleration. It is customary with such form of shears to make an allowance of several inches in the length of the sheared pieces. With rotary shears a more or less complicated operating mechanism has been required to get the shears into and out of operative position and to rotate them at the necessary speed.

As strips frequently leave the last stand of rolls at a speed as high as one thousand feet per minute, it is obvious that if it is desired to shear the strips into twenty foot lengths, for example, the shearing mechanism must operate with considerable rapidity, only a fraction of a second being allowed for the actual shearing.

This invention provides a continuously operating shear requiring a minimum expenditure of power, and adapted to shear into lengths having greater uniformity. The mechanism is also easily adjustable to vary the length into which the strips are sheared.

In the accompanying drawings, there is shown more or less diagrammatically for purposes of illustration only, one embodiment of the present invention, it being understood that the drawings do not define the limits of invention and that changes may be made in the construction and operation disclosed therein without departing from the spirit of the invention or scope of my broader claims.

In the drawings, Figure 1 is a side elevation, partly in section and partly broken away, illustrating one form of the invention; Figure 2 is a vertical sectional view, partly broken away, on the line II—II of Figure 1, and Figure 3 is a detail view, on an enlarged scale, of a portion of the operating mechanism for the flying shear.

In an apparatus constructed in accordance with the present invention, there may be provided a pair of spaced guides 2 adapted to extend in parallel relationship on opposite sides of the path of travel of a strip S as it is delivered from the last stand of rolls 3 of a rolling mill. These guides may be of any desired length and construction in accordance with the specific construction of the flying shear and the amount of travel which the shear is to have thereon.

The shear itself may comprise a suitable frame 4 having extending from an intermediate portion thereof projections 5 shaped to co-operate with the guides 2 and support the frame in operative position therebetween. The projections 5 are preferably located with regard to the center of gravity of the frame 4 whereby during operation thereof it will tend to move smoothly on the guides.

Extending upwardly from the lower portion of the frame is a standard carrying a relatively fixed shearing blade 6 adapted to lie below the strip S as it is delivered by the rolling mill. Formed in opposite sides of the upper portion of the frame are guides 7 adapted to slidably receive a cross-head 8 carrying at its lower portion a relatively movable shearing blade 9. The cross-head 8 may conveniently be formed with apertures 10 therein through which are adapted to extend cross-pieces 11 having seats on their upper surfaces for heavy compression springs 12, the opposite ends of which may directly co-operate with the cross-head. These springs normally tend to urge the cross-head 8 upwardly, as illustrated in Figures 1 and 2, whereby the blade 9 is held in spaced relation to the blade 6 to provide a clearance space therebetween for the passage of the strip S.

The cross-head 8 is adapted to be periodically depressed to bring the blade 9 into operative shearing relationship with the blade 6 by the action of trips 13 pivotally carried at one end on brackets 14 extending upwardly from the frame 4 and overlying the cross-head 8. It will be apparent that as these trips are depressed they will serve to correspondingly lower the cross-head. This depression may be secured by the provision of cams 15 carried by a common shaft 16 located above the frame 4 and extending transversely with respect to the guides 2. The shaft 16 is adapted to be continuously rotated during the operation of the rolling mill, at a substantially constant speed, whereby the cams 15 will depress the trips 13 at definitely determined times with respect to the delivery speed of the strip S. This rotation may be accomplished by a gear 17 meshing with an intermediate gear 18 which, in turn, is driven by a similar gear 19. The gears 17 and 19 preferably have the same number of teeth whereby they will have the same R. P. M. It will be apparent that a separate gear train may be provided on each side of the flying shear, if desired, or that a single gear train may be utilized. It is desirable, however, to provide duplicate gear trains as the operation of the shear is more nearly balanced thereby. The gear or gears 19 may be carried by a shaft 20 which, in turn, is driven by a suitable source of power (not shown), but of such construction as to maintain a substantially uniform given speed.

On the shaft 20 there may be provided one or more disks 21 each of which is provided with a crank pin 22. These crank pins are adapted to operate pitman rods 23 which are connected at their opposite ends to pins 24 projecting laterally from the sides of the frame 4. These pins 24 are preferably located adjacent the rear portion of the frame and immediately above the guides 2, whereby operation of the pitman rods will tend to smoothly reciprocate the frame 4 on its guides. If desired, the crank pins 22 may be carried by suitable adjusting mechanisms 25 whereby the radius of the crank circle may be changed as desired for reasons more fully pointed out hereinafter. Co-operating with the mechanisms 25 may be indicating scales 26 which will be graduated in readings indicating the length of the pieces which will be cut from the strips.

It is obvious that in order to prevent cobbling of the strip S during the shearing operation, it is essential that the instantaneous speed of the shear blades at the time of cutting shall correspond exactly to the speed of travel of the strip S. As the delivery speed during a given period of operation remains substantially constant, and as the operation of the flying shear may be maintained substantially constant at any given speed, it will be apparent that the length of the pieces into which the strip is cut will be determined by dividing the delivery speed in feet per minute by the R. P. M. of the disks 21. The speed of movement of the shearing mechanism, however, will depend upon the distance through which it reciprocates during each revolution of the shaft 20, which in turn will depend upon the distance of the crank pins 22 from the center of the shaft 20. This latter distance, as pointed out, may be varied by the adjusting mechanisms 25. The designations on the scales co-operating with the adjusting mechanisms will be indicative of the length of the circumference through which the crank pins 22 will rotate with a given setting, or in other words will be equivalent in each instance to $2\pi R$, wherein R equals the distance from the center of the shaft 20 to the center of the crank pins 22. Such designations will also be indicative of the length of the pieces into which the strip will be cut with such setting.

Specifically, it may be assumed that the delivery speed of the strip S is 926 feet per minute and that it is desired to cut the same into twenty-foot lengths. By dividing 926 by 20 it becomes apparent that the speed at which the disks 21 must be rotated is 46.3 R. P. M. The governor on the source of power for the shaft 20 will be correspondingly set, and the flying shear may then be operated. Irrespective of the exact position of the crank pins 22, the shear 9 will be operated 46.3 times per minute thereby cutting the strip into the desired length. There is, however, but a single setting at which the instantaneous speed of the shears corresponds to the speed of the strip and this setting may be obtained by moving the crank pins to a position where they coincide with the numeral 20. It will be apparent that the construction is such that with a given speed of delivery of the material, the length of the pieces into which the material is cut is dependent upon the number or reciprocations which the shearing mechanism makes in a unit of time, and that the adjusting means for varying the position of the crank pins relative to the center of the shaft 20 enables the speed of the shearing mechanism to be maintained equal to the speed of delivery of the material at the instant of cut, irrespective of the length of the pieces into which the material is being cut.

Theoretically, there are but two points in a revolution at which the movement of the crank pins 22 will be effective for producing a movement of the flying shear corresponding to their own speed of travel. From a practical standpoint, however, an arc of approximately 15° may be allowed for beginning, effecting and completing each cut. Referring to Figure 1, there are three lines $a$, $b$ and $c$ coinciding with radii of the gears 19 or the disks 21. The cams 15 will be so timed that when the crank pins 22 reach a position on the line $a$ the cutting operation will be commenced and will continue until the axis of the crank pins coincides with the line b. At this time, the cut will be completed and until the line c is reached the blades will be withdrawing from engagement with the strip. At any point on the line b, the instantaneous speed of the shear blades will correspond exactly with the speed of delivery of the strip.

In order to prevent any tendency of the oncoming end of a cut strip to engage behind the blade 9, there may be provided one or more spring operated pushers 27 effective for urging the oncoming end of the cut strip downwardly.

In the operation of a flying shear of this character, the disks 21 may be very heavy to serve as fly wheels and may be continuously rotated, whereby the shear requires a relatively small and substantially constant amount of power as contrasted to the usual swinging shear. This is highly desirable as power consumption representing a constant load factor is very economical as compared to a varying load factor. Also, due to the relationship existing between the speed of delivery of a strip and the speed of operation of the flying shear, a great degree of uniformity is insured.

Further advantages of the invention arise from the adjusting means whereby the desired speed relationship between the movement of the shear blades and the steel may be maintained. Also, the shear blades always travel in a direction substantially parallel to the direction of travel of the strip, thereby making it unnecessary to deflect the strip from its natural path of travel, and enabling the use of two rigidly mounted blades.

I claim:

1. Shearing mechanism, comprising shearing means adapted to reciprocate relative to a moving material to shear the material into lengths, a pivoted cam following lever on the reciprocating means, and a cam for actuating the lever to effect a shearing stroke of the shears.

2. Shearing mechanism, comprising shearing means adapted to reciprocate relative to a moving material to shear the material into lengths, pivoted means on the reciprocating means for effecting a shearing stroke of the shears, and a rotary cam for impelling the pivoted means.

3. Shearing mechanism, comprising shearing means adapted to reciprocate relative to a moving material to shear the material into lengths, a lever pivoted on the reciprocating means and adapted to contact with a movable shear blade assembly to effect a shearing stroke of the blade, and means stationarily mounted but adapted to operate the lever to cause such shearing stroke.

4. Shearing mechanism, comprising shearing means adapted to reciprocate relative to a moving material to shear the material into lengths, a rotary cam, and a lever mounted on the reciprocating means and adapted to slidably engage the cam during reciprocation, the cam being adapted to actuate the lever to cause a shearing stroke of the shears.

5. Shearing mechanism, comprising shearing means, a crank for reciprocating the shearing means relatively to a moving material, and a rotary cam connected with the crank for effecting a shearing stroke of the shears at a predetermined point in the reciprocatory motion thereof.

In testimony whereof I have hereunto set my hand.

FLORENCE C. BIGGERT, Jr.